United States Patent
Sugawara (10) Patent No.: US 12,296,382 B2
(45) Date of Patent: *May 13, 2025

(54) METHOD FOR PRODUCING SILVER POWDER

(71) Applicant: DOWA ELECTRONICS MATERIALS CO., LTD., Tokyo (JP)

(72) Inventor: Satoko Sugawara, Tokyo (JP)

(73) Assignee: DOWA ELECTRONICS MATERIALS CO., LTD., Tokyo (JP)

(*) Notice: Subject to any disclaimer, the term of this patent is extended or adjusted under 35 U.S.C. 154(b) by 249 days.

This patent is subject to a terminal disclaimer.

(21) Appl. No.: 17/793,976

(22) PCT Filed: Mar. 22, 2021

(86) PCT No.: PCT/JP2021/011808
§ 371 (c)(1),
(2) Date: Jul. 20, 2022

(87) PCT Pub. No.: WO2021/193575
PCT Pub. Date: Sep. 30, 2021

(65) Prior Publication Data
US 2023/0073837 A1 Mar. 9, 2023

(30) Foreign Application Priority Data
Mar. 24, 2020 (JP) ................. 2020-053413

(51) Int. Cl.
*B22F 1/102* (2022.01)
*B22F 1/00* (2022.01)
(Continued)

(52) U.S. Cl.
CPC ............ *B22F 1/102* (2022.01); *B22F 1/00* (2013.01); *B22F 1/05* (2022.01); *B22F 1/16* (2022.01); *B22F 9/24* (2013.01); *H01B 1/02* (2013.01)

(58) Field of Classification Search
CPC ... H01B 1/02; B22F 1/05; B22F 1/102; B22F 1/105; B22F 1/16; B22F 9/18
See application file for complete search history.

(56) References Cited

U.S. PATENT DOCUMENTS 9,984,788 B2 * 5/2018 Michiaki ......... H01L 31/022425
2005/0279970 A1 * 12/2005 Ogi ..................... B22F 9/24
252/514

FOREIGN PATENT DOCUMENTS

JP 10-88207 4/1998
JP 2006-002228 1/2006
(Continued)

OTHER PUBLICATIONS

English language translation of ISR237 (mail date Mar. 24, 2020).*
(Continued)

*Primary Examiner* — Mark Kopec
(74) *Attorney, Agent, or Firm* — Christopher W. Brody; Millen, White, Zelano & Branigan, P.C.

(57) ABSTRACT

A method is provided for producing a silver powder which has a smaller particle size distribution than the conventional one without changing the type of surface treatment agent, and also for enabling a low resistance when the silver powder is made into a paste to form an electrode. The method for producing a silver powder includes adding an O/W-type emulsion containing micelles of a surface treatment agent having a volume-based cumulative 50% particle diameter $D_{50}$ obtained by a laser diffraction particle size distribution analysis of 1.5 μm or less to a slurry of a silver powder. The dispersibility of the silver powder in the slurry containing the silver powder is then improved.

6 Claims, 4 Drawing Sheets

(51) Int. Cl.
*B22F 1/05* (2022.01)
*B22F 1/16* (2022.01)
*B22F 9/24* (2006.01)
*H01B 1/02* (2006.01)

(56) References Cited

FOREIGN PATENT DOCUMENTS

| | | |
|---|---|---|
| JP | 2011-068932 | 4/2011 |
| WO | 2013/073607 | 5/2013 |
| WO | 2013/133103 | 9/2013 |

OTHER PUBLICATIONS

Lin et al "Effects of surfactant treatment of silver powder on the rheology of its thick- film paste", Materials Chemistry and Physics 45 (1996) 136-144.*
Hong et al "Preparation of Well-Dispersed Silver Nanoparticles for Oil-Based Nanofluids", Ind. Eng. Chem. Res. 2010, 49, 1697-1702.*
Dong et al "Synthesis of stearic acid-stabilized silver nanoparticles in aqueous solution", Advanced Powder Technology 27 (2016) 2416-2423.*
Zhang et al "Sonication synthesis of micro-sized silver nanoparticle/ oleic acid liquid marbles: A novel SERS sensing platform", Sensors and Actuators B 223 (2016) 52-58.*

* cited by examiner

METHOD FOR PRODUCING SILVER POWDER

TECHNICAL FIELD

The present invention relates to a method for producing a silver powder, and more particularly relates to a method for producing a silver powder suitable for use in an electrically conductive paste for forming an electrical conduction path in an element such as an electrode or a circuit of various electronic components.

BACKGROUND ART

Conventionally, in the formation of an electrode, a circuit, or the like of an electronic component, a resin-type or firing-type silver paste is often used. In recent years, for an electrically conductive paste using a silver powder, an increase in the density of conductor patterns or formation of a finer line such that the thickness of a wire is reduced due to miniaturization of an electronic component is required. Further, also in order to improve the power generation efficiency by increasing the light collecting area of a solar cell, a finger electrode is required to be thinned. If coarse particles are present in the silver powder contained in the silver paste, a plate may be clogged when a pattern is formed by printing, which may cause disconnection of a circuit, and therefore, as the silver powder for an electrically conductive paste, a silver powder which contains no coarse particles has been demanded.

As a method for producing a silver powder for an electrically conductive paste, for example, PTL 1 discloses a method for producing a silver powder having excellent low-temperature sinterability, in which formalin that is a reducing agent is added to an aqueous solution containing a silver-ammine complex, and thereafter, an emulsion of stearic acid that acts as a dispersant for a reduced and deposited silver powder is added thereto, thereby obtaining a silver powder.

CITATION LIST

Patent Literature

PTL 1: JP-A-2006-002228

SUMMARY OF INVENTION

Technical Problem

In the method for producing a silver powder disclosed in PTL 1, in order to improve the dispersibility of the reduced and deposited silver powder, the silver powder is surface-treated with stearic acid which is a dispersant, but the stearic acid is added in an emulsion state. In the production method disclosed in PTL 1, the reason why a fatty acid such as stearic acid which is a surface treatment agent is added in an emulsion state is that the fatty acid has a high melting point and is poorly soluble in water, and it is difficult to uniformly disperse it as it is in an aqueous solution in which the silver powder is dispersed. Therefore, the fatty acid is emulsified in advance, that is, an emulsion in which fine micelles of the fatty acid are dispersed in water is formed, and the emulsion is added to the slurry containing the silver powder.

However, it was found that in the production method disclosed in PTL 1, the generation of coarse silver secondary particles cannot be completely prevented.

The sinterability of the silver paste is greatly affected by the surface state of the silver powder, particularly the surface treatment agent adhered to the surface of the silver powder. Further, the combination of an organic solvent, an organic resin binder, and various additives constituting the silver paste also needs to be changed when changing the surface treatment agent adhered to the surface of the silver powder. Therefore, it is desired to improve the dispersibility of the silver powder, resulting in suppressing the formation of coarse silver powder particles without changing the type of surface treatment agent.

That is, a technical problem to be solved in the present invention is to provide a method for producing a silver powder which has a smaller particle size distribution than the conventional one without changing the type of surface treatment agent for the silver powder, and then, a method for producing a silver powder which enables a low resistance when the silver powder is made into a paste to form an electrode.

Solution to Problem

As a result of intensive studies to achieve the above-mentioned object, the present inventor found that by reducing the particle diameter of micelles of a surface treatment agent contained in an emulsion of the surface treatment agent added in a step of producing a silver powder, the dispersibility of the silver powder in a slurry containing the reduced and deposited silver powder is improved.

Based on the above findings, the present inventor completed the present invention described below.

That is, in order to achieve the above-mentioned object, the present invention provides (1) a method for producing a silver powder, in which silver ions are converted into a silver complex with a complexing agent and the silver complex is reduced, thereby obtaining a silver powder, including:
   a silver complexing step of forming a silver-ammine complex aqueous solution using ammonium ions as the complexing agent for complexing the silver ions;
   a reduction step of reducing the silver complex with a reducing agent by adding the reducing agent to the aqueous solution containing the silver complex, thereby obtaining a slurry of a silver powder; and
   an emulsion addition step of adding an O/W-type emulsion containing micelles of a surface treatment agent having a volume-based cumulative 50% particle diameter $D_{50}$ obtained by a laser diffraction particle size distribution analysis of 1.5 μm or less to the slurry of the silver powder, thereby treating the surface of the silver powder.

(2) In the production method of the above (1), it is preferred that the volume-based cumulative 50% particle diameter $D_{50}$ obtained by the laser diffraction particle size distribution analysis of the micelles of the surface treatment agent contained in the emulsion is 0.4 μm or less.

(3) In the production method of the above (1) or (2), it is preferred that the surface treatment agent contained in the emulsion is a fatty acid having 8 or more carbon atoms in a straight chain.

(4) In the production method of the above (1) to (3), it is preferred that the surface treatment agent contained in the emulsion is a long-chain fatty acid having 12 or more carbon atoms.

(5) In the production method of the above (1) to (4), it is preferred that the surface treatment agent contained in the emulsion is one type or two types of palmitic acid and stearic acid.

(6) In the production method of the above (1) to (4), it is preferred that the surface treatment agent contained in the emulsion is either linoleic acid or linolenic acid.

Advantageous Effects of Invention

By using the production method of the present invention, a silver powder which has a smaller particle size distribution than the conventional one without changing the type of surface treatment agent for the silver powder, and enables a low resistance when the silver powder is made into a paste to form an electrode can be obtained.

DESCRIPTION OF EMBODIMENTS

[Starting Material]

In the method for producing a silver powder of the present invention, an aqueous solution in which a complexing agent is added to an aqueous solution containing silver(1) ions as a starting material to form a silver complex is used as a starting material. As a supply source of the silver ions, an industrially used known inorganic silver salt such as silver (1) nitrate, silver(1) sulfate, silver(1) carbonate, silver(1) chloride, or silver(1) oxide can be used.

In the present invention, although not particularly specified, the concentration of silver ions in the aqueous solution is preferably 0.1 mass % or more and 10 mass % or less at a stage before the addition of the below-mentioned reducing agent. If the concentration of silver ions is less than 0.1 mass %, the amount of the silver powder that can be produced by one reaction is reduced, which is not preferred. Further, if the concentration of silver ions exceeds 10 mass %, the viscosity of the reaction solution after the deposition of silver particles increases, and the reaction solution may not be able to be uniformly stirred, which is not preferred.

[Complexing Agent]

As the complexing agent for silver ions, ammonium ions such as aqueous ammonia or an ammonium salt, or a chelate compound such as a salt of ethylenediaminetetraacetic acid (EDTA) can be used, but it is preferred to use ammonium ions, which easily form a complex with silver ions, is easily washed away, and is less likely to leave impurities. When ammonium ions are used as the complexing agent, a silver-ammine complex is formed in the aqueous solution. In this case, the coordination number of the ammine complex is 2, and therefore, 2 or more moles of ammonium ions are added per mole of silver ions.

[Reducing Agent]

In the method for producing a silver powder of the present invention, in order to reduce the silver complex and deposit silver in a metallic state, a known reducing agent can be used. Examples of the reducing agent include formalin, ascorbic acid, hydrazine, alkanolamine, hydroquinone, oxalic acid, formic acid, aldehydes, alcohols organic substances such as saccharides, lower oxides of metals, sodium borohydride, and the like, but it is preferred to use one or more types of ascorbic acid, glucose, formaldehyde, hydrazine, and hydrazine carbonate, whose reactivity is stable to some extent, and which can rapidly reduce silver, and among them, it is preferred to use formaldehyde, hydrazine, or hydrazine carbonate.

The addition amount of the reducing agent is preferably 1 equivalent or more with respect to silver in order to increase the yield of silver, and may be 2 equivalents or more, for example, 10 to 20 equivalents with respect to silver when a reducing agent having a low reducing power is used.

As the method of adding the reducing agent, in order to prevent the aggregation of the reduced and deposited silver powder, it is preferred to add the reducing agent at a rate of 1 equivalent/min or more with respect to the amount of silver ions. Further, at the time of reduction, it is preferred to stir the silver-ammine complex aqueous solution and the reaction solution after silver particles are deposited from before the addition of the reducing agent until the completion of the reduction deposition step. Further, the temperature when the reducing agent is added to reduce and deposit the silver particles is preferably 5° C. or higher and 80° C. or lower, and more preferably 5° C. or higher and 40° C. or lower.

[Silver Powder]

When the above-mentioned reducing agent is used in the method for producing a silver powder of the present invention, a silver powder having a volume-based cumulative 50% particle diameter $D_{50}$ by a laser diffraction method of 0.3 μm or more and 5 μm or less is obtained. In the silver powder, as compared with the case where the emulsion of the present invention is not used, the $(D_{90}-D_{10})/D_{50}$ ratio when the volume-based cumulative 10% particle diameter by a laser diffraction method is represented by $D_{10}$ and the volume-based cumulative 90% particle diameter is represented by $D_{90}$, that is, the width of the particle diameter distribution becomes narrower, and the particle size distribution becomes smaller.

[Surface Treatment Agent]

In the method for producing a silver powder of the present invention, in order to improve the dispersibility of a reduced and deposited silver powder, the silver powder is treated with a surface treatment agent. As the surface treatment agent, a hydrophobic dispersant is preferred, and a fatty acid or a salt thereof can be used. By using a fatty acid or a salt thereof, both the adsorption of the surface treatment agent to silver and the dispersibility of the silver particles can be achieved. Examples of the fatty acid (the number of carbon atoms in parentheses) include propionic acid (3), caprylic acid (8), lauric acid (12), myristic acid (14), palmitic acid (16), stearic acid (18), behenic acid (22), acrylic acid (3), oleic acid (18), linoleic acid (18), linolenic acid (18), arachidonic acid (20), and the like, and in the present invention, it is preferred to use a fatty acid having 8 or more carbon atoms in a linear chain, it is more preferred to use a long-chain fatty acid having 12 or more carbon atoms, it is further more preferred to use a long-chain fatty acid having 16 or more carbon atoms, and the number of carbon atoms is more preferably 20 or less. As the surface treatment agent, it is particularly preferred to use one type or two types of palmitic acid (melting point: 62.9° C.) and stearic acid (melting point: 69.6° C.). Further, linoleic acid and linolenic acid are particularly preferred in terms of reducing the viscosity when being made into a paste.

This is because a fatty acid having less than 8 carbon atoms has water solubility and therefore does not need to be emulsified, and also the adsorption of the surface treatment agent to silver is weak. This is because by setting the number of carbon atoms to 12 or more, it is easy to obtain dispersibility required for the silver powder. Palmitic acid and stearic acid are easy to obtain. This is because if the number of carbon atoms exceeds 20, it becomes difficult to adjust the viscosity or the like when it is made into a paste. Note that a fatty acid exemplified above available on the market may contain another fatty acid. For example, in a stearic acid reagent, the amount of stearic acid is usually not 100 mass %, and another fatty acid that is difficult to separate in the production process is usually also contained. Therefore, the above-mentioned fatty acid to be used for emulsification may be one containing the fatty acid as a main component in an amount of 50 mass % or more (also referred to as a purity of 50% or more) in a GC-MS analysis, and may contain another fatty acid other than the main component.

[Emulsion]

Many of the above-mentioned fatty acids to be used as the surface treatment agent are a solid at room temperature and are also poorly soluble in water, and therefore are emulsified in advance and added in a state of being converted into a liquid to the slurry of the reduced and deposited silver powder so as to adhere the surface treatment agent to the surfaces of the silver particles. It is preferred to use a surfactant at the time of emulsification. Examples of the surfactant include RHEODOL TW-P120, EMULGEN 350, and EMULGEN 120 of Kao Corporation, and the like. In the emulsification, the fatty acid forms micelles and is dispersed in the aqueous solution as fine droplets.

The concentration of the fatty acid in the emulsion is preferably 0.1 mass % or more and less than 50 mass %. Then, the concentration of the fatty acid in the emulsion in a diluted state in the same manner as when it is added into the aqueous solution in the production of the silver powder is set to preferably 0.1 mass % or more and less than 5 mass %, and more preferably 1 mass % or more and 5 mass % or less.

The method for producing a silver powder of the present invention is characterized in that the volume-based cumulative 50% particle diameter $D_{50}$ of the micelles containing the fatty acid and the surfactant contained in the emulsion prepared in advance is set to 1.5 μm or less. The cumulative 50% particle diameter $D_{50}$ is preferably 1.0 μm or less, the cumulative 50% particle diameter $D_{50}$ is more preferably 0.7 μm or less, and further more preferably 0.4 μm or less in order to enhance the effect of reducing coarse particles. In the present invention, the lower limit of the cumulative 50% particle diameter $D_{50}$ of the micelles is not particularly limited, but is, for example, 1 nm or more. A method for measuring the cumulative 50% particle diameter $D_{50}$ of the micelles will be described later.

When the volume-based cumulative 50% particle diameter $D_{50}$ of the micelles contained in the commercially available stearic acid emulsion described in PTL 1 was measured, it was 4.0 μm. In the method for producing a silver powder of the present invention, by making the particle diameter of the micelles smaller than the conventional one, when the emulsion containing the surface treatment agent is added into the slurry containing the silver powder, the speed at which the emulsion is dispersed in the slurry becomes fast, and the surface treatment agent can be uniformly adhered to the surfaces of the silver particles in the slurry, and the ability to suppress the aggregation of the silver particles is improved. Therefore, it is considered that by setting the cumulative 50% particle diameter $D_{50}$ of the micelles to 1.5 μm or less, the width of the particle diameter distribution quantified by the $(D_{90}-D_{10})/D_{50}$ ratio when the volume-based cumulative 10% particle diameter by a laser diffraction method is represented by $D_{10}$ and the volume-based cumulative 90% particle diameter is represented by $D_{90}$ becomes narrower to make the particle size distribution smaller, and thus, the particle size can be made more uniform than in the past. In addition, it is considered that also when the silver powder is made into an electrically conductive paste, as compared with the case where a conventional surface treatment agent with a large size is adhered to the surfaces of the silver particles, in the case where the surface treatment agent with a small size is adhered thereto, the compatibility with a solvent, a resin, an additive, or the like to be used in the electrically conductive paste becomes better, and as a result, this leads to the reduction in the resistance of an electrode using the electrically conductive paste.

[Method for Preparing Emulsion]

Specific examples of the method for preparing the above-mentioned emulsion include the following three methods.

(1) A commercially available emulsion in which the volume-based cumulative 50% particle diameter $D_{50}$ of the micelles of the surface treatment agent is 2 μm or more (original emulsion: Selosol 920 manufactured by Chukyo Yushi Co., Ltd. satisfies this condition) is used as a starting material and heated to a temperature, which is equal to or higher than the melting point of the surface treatment agent contained in the emulsion and also equal to or higher than the temperature at which the surfactant separates from the surface treatment agent, and stirred by a known stirring means, and then cooled after the volume-based cumulative 50% particle diameter $D_{50}$ of the micelles of the surface treatment agent becomes 1 μm or less. In this case, it is preferred to use a homogenizer as the stirring means.

(2) A commercially available emulsion in which the volume-based cumulative 50% particle diameter $D_{50}$ of the micelles of the surface treatment agent is 2 μm or more (original emulsion) is used as a starting material and maintained at a temperature, which is lower than the melting point of the surface treatment agent contained in the emulsion, and at which the surfactant separates from the surface treatment agent, for 1 minute or more, and heated to a temperature equal to or higher than the melting point of the surface treatment agent after confirming that a solid of the surface treatment agent is generated in the liquid, and stirred by a known stirring means, and then cooled after the volume-based cumulative 50% particle diameter $D_{50}$ of the micelles of the surface treatment agent becomes 1 μm or less. In this case, it is preferred to use a homogenizer as the stirring means.

In the case of the preparation method described in (2), an emulsion in which the micelles have a smaller particle diameter can be obtained.

(3) A surfactant is added to a fatty acid which is the above-mentioned surface treatment agent, the respective materials are melted at a temperature equal to or higher than the respective melting points, and thereafter, boiling water is added thereto so as to prevent solidification, and stirring is performed by a known stirring means, and then, cooling is performed after the volume-based cumulative 50% particle diameter $D_{50}$ of the micelles of the surface treatment agent becomes 1 μm or less. In this case, it is preferred to use a homogenizer as the stirring means.

When the surface treatment agent such as a fatty acid is emulsified, micelles are formed by binding the fatty acid and the surfactant. The temperature at which a nonionic surfactant that forms micelles by binding to a surface treatment agent separates from the surface treatment agent is called a cloud point. Here, the temperature at which the nonionic surfactant separates from the surface treatment agent is a temperature at which the surface treatment agent whose bond to the nonionic surfactant is broken begins to be recognized (in Example 2 below, the temperature at which a solid of the fatty acid begins to appear) when the temperature of the emulsion is raised. In the case of the above-mentioned surfactant, the cloud point is about 30 to 80° C., and the cloud point of Selosol in the following Examples is 60° C.

As the homogenizer, a commercially available one can be used. A homogenizer in which the tip of the shaft has a structure composed of a fixed outer blade and a rotating inner blade, and pulverization and homogenization can be carried out by the effect of ultrasonic waves, high frequencies, etc. that occur between the inner blade and the window of the outer blade is preferred, and for example, a biomixer (model: BM-4) manufactured by Nihonseiki Kaisha, Ltd., or the like can be used.

The conditions for stirring using the homogenizer described above depend on the amount of the emulsion to be treated, but for example, the rotation speed of the inner blade of the homogenizer with respect to 50 mL of the emulsion liquid amount is set to preferably 7,000 rpm or more, and more preferably 10,000 rpm or more. Further, the stirring time using the homogenizer is set to preferably 10 seconds or more, and more preferably 1 minute or more. This is because the smaller the amount of stirring (rotation speed× time) with respect to the liquid amount is, the more difficult it is to reduce the particle diameter of the micelles by that amount.

Further, as the above-mentioned cooling method, a usual cooling method may be used, and for example, cooling may be performed to room temperature or the liquid temperature of the slurry containing the silver particles in the method for producing a silver powder described later by allowing it to cool to room temperature or by performing gradual cooling or water cooling using the temperature adjustment function of a hot bath.

[Method for Measuring Particle Size Distribution of Micelles Contained in Emulsion]

The particle size distribution of the micelles of the surface treatment agent contained in the emulsion is measured using a laser diffraction particle size distribution analyzer (for example, Microtrac MT3300EXII manufactured by Nikkiso Co., Ltd.). As a dispersion medium, pure water is used, and the volume-based particle size distribution is measured. The volume-based cumulative 10% particle diameter ($D_{10}$), cumulative 50% particle diameter ($D_{50}$), cumulative 90% particle diameter ($D_{90}$), and cumulative 95% particle diameter ($D_{95}$), and the maximum particle diameter ($D_{max}$) automatically calculated in the analyzer are used. The steepness of the particle size distribution is evaluated by the ($D_{90}$–$D_{10}$)/$D_{50}$ ratio.

In the measurement of the particle size distribution, it is preferred to measure the emulsion diluted with pure water at the same dilution ratio (for example, 10 times) as when it is added into the aqueous solution at the time of producing a silver powder described below.

[Method for Producing Silver Powder]

In the embodiment of the method for producing a silver powder of the present invention, ammonium ions are added to an aqueous solution containing silver ions, thereby forming a silver-ammine complex (silver complexing step), and a reducing agent is added to the obtained silver-ammine complex aqueous solution, thereby reducing and depositing silver particles (reduction step). After the silver particles are reduced and deposited with the reducing agent, an emulsion in which the volume-based cumulative 50% particle diameter $D_{50}$ of micelles of a surface treatment agent is 1.5 μm or less is added into a slurry containing the silver particles, thereby adhering the surface treatment agent to the surfaces of the silver particles (emulsion addition step).

The amount of the fatty acid contained in the emulsion to be added is preferably 0.1 mass % or more and 1.2 mass % or less with respect to the amount of silver in the silver-ammine complex aqueous solution. When the amount of the fatty acid is less than 0.1 mass % with respect to the amount of silver, the frequency of occurrence of coarse silver particles may increase. Further, also when the amount of the fatty acid exceeds 1.2 mass % with respect to the amount of silver, the frequency of occurrence of coarse silver particles may increase. More preferably, the amount of the fatty acid contained in the emulsion to be added is 0.1 mass % or more and 1.0 mass % or less, and more preferably 0.8 mass % or less with respect to the amount of silver in the silver-ammine complex aqueous solution.

The reducing agent need only be a reducing agent that reduces and deposits silver particles, and as described above, one or more types of ascorbic acid, glucose, formaldehyde, hydrazine, and hydrazine carbonate can be used, and it is preferred to use formaldehyde, hydrazine, or hydrazine carbonate.

It is preferred that after the silver particles are reduced and deposited, the silver-containing slurry containing the silver particles surface-treated by adding the emulsion containing the micelles of the surface treatment agent is subjected to solid-liquid separation, and the obtained solid material is washed with pure water to remove impurities in the solid content. The end point of this washing can be determined by the electrical conductivity of water after washing. Preferably, washing is performed until the electrical conductivity of water after washing becomes 0.5 mS/m or less.

A block-shaped cake obtained after washing contains much water, and therefore, it is preferred to obtain a dried silver powder by a dryer such as a vacuum dryer. At this time, in order to prevent sintering of the silver particles at the time of drying, the drying temperature is preferably 100° C. or lower. Further, the obtained silver powder may be subjected to a dry crushing treatment or a classification treatment.

[Measurement of Particle Size Distribution]

The particle size distribution of the silver powder was measured using a laser diffraction particle size distribution analyzer (Microtrac MT3300EXII manufactured by Nikkiso Co., Ltd.) after crushing was performed using a sample mill SK-M10 manufactured by Kyoritsu Riko Co., Ltd., and 0.1 g of the silver powder was dispersed in isopropyl alcohol (IPA), followed by stirring for 2 minutes using an ultrasonic homogenizer (model: US-150T) manufactured by Nihonseiki Kaisha, Ltd.

[Method for Producing Silver Paste]

As for the silver paste, 86.2 mass % of a silver powder obtained in any of Examples and Comparative Examples described below, 8.0 mass % of an epoxy resin (EP4901E manufactured by ADEKA CORPORATION), 1.6 mass % of a curing agent (Amicure MY-24, manufactured by Ajinomoto Fine-Techno Co., Ltd.), and 4.2 mass % of a solvent (BCA: butyl carbitol acetate) were mixed by stirring at 1,400 rpm for 30 seconds using a propellerless rotation and revolution stirring defoaming device (AR250 manufactured by Thinky Corporation), and thereafter, kneading was performed using three rolls (80S manufactured by EXAKT, Inc.) by allowing the mixture to pass through a roll gap from 100 μm to 20 μm, whereby an electrically conductive paste was obtained.

[Screen Printing]

With respect to the electrically conductive paste obtained by the above procedure, a line pattern having a width of 500 μm and a length of 37.5 mm was printed using a screen printer (MT-320T manufactured by Microtech, Inc.) under the condition of a squeegee pressure of 0.18 MPa, whereby a film of the electrically conductive paste was formed. The obtained film was heated and cured at 200° C. for 40 minutes using an air circulation dryer, thereby forming an electrically conductive film. With respect to each of the obtained electrically conductive films, the average thickness of the electrically conductive film was measured by measuring a level difference between a portion where a film was not printed on an aluminum substrate and a portion of the electrically conductive film using a surface roughness meter (Surfcom 480B-12 manufactured by Tokyo Seimitsu Co., Ltd.). On the other hand, the resistance value of each of the electrically conductive films was measured using a digital multimeter (R6551 manufactured by Advantest Corporation). The volume of the electrically conductive film was determined from the size (film thickness, width, and length) of the electrically conductive film, and the volume resistivity was determined from this volume and the measured resistance value.

Further, the screen-printed substrate was embedded in a resin, and a cross section was exposed by polishing using an ion milling device ArBlade 5000 manufactured by Hitachi High-Technologies Corporation, and the cross section of the electrically conductive film was observed with a scanning electron microscope (SEM).

EXAMPLES

Comparative Example 1

Figure 1:
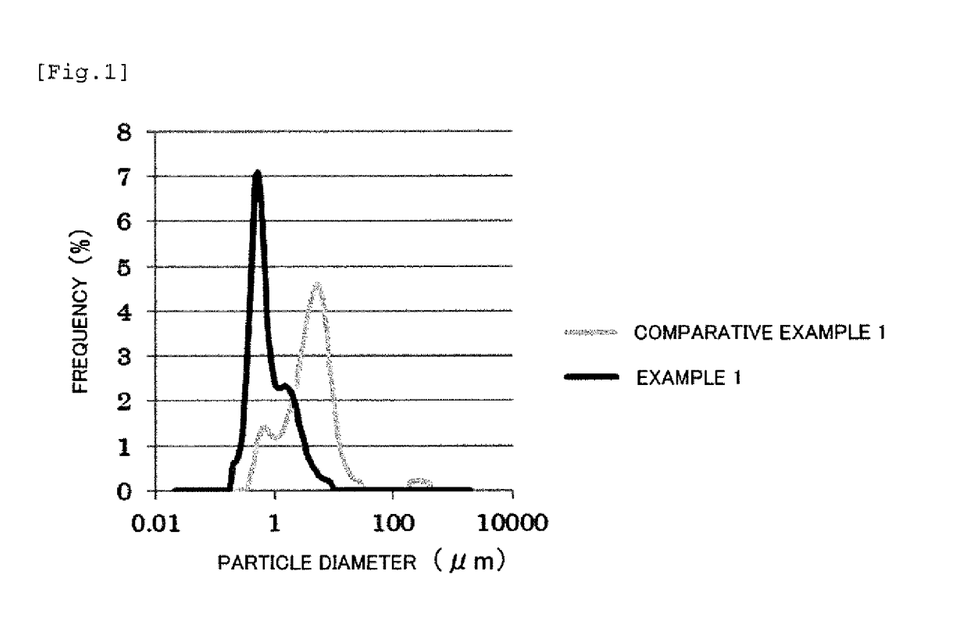
FIG. 1 is a graph of comparison of the measurement results of the particle diameter distribution of micelles contained in emulsions obtained in Example 1 and Comparative Example 1.

Pure water was added to 5 g of a stearic acid emulsion (Selosol 920 manufactured by Chukyo Yushi Co., Ltd., containing 82% of water), which is an example of a commercially available emulsion, and the total liquid amount was brought to 50 mL in accordance with the dilution ratio at the time of producing a silver powder described later (diluted 10 times), and the particle size distribution of the micelles contained in the emulsion was measured using Microtrac MT3300EXII manufactured by Nikkiso Co., Ltd. The measurement result of the particle size distribution is shown in FIG. 1.

The micelles contained in the emulsion diluted 10 times had a volume-based cumulative 10% particle diameter $D_{10}$ of 0.8 μm, a cumulative 50% particle diameter $D_{50}$ of 4.0 μm, and a cumulative 90% particle diameter $D_{90}$ of 9.8 μm. The measurement results are shown in Table 1.

162 g of industrial aqueous ammonia at a concentration of 28 mass % (corresponding to 5.3 molar equivalents of ammonia per mole of silver) was added to 3,327 g of a silver nitrate aqueous solution containing 54 g of silver, whereby a silver-ammine complex aqueous solution was obtained. To this silver-ammine complex aqueous solution, 6.0 g of a sodium hydroxide aqueous solution at a concentration of 20 mass % was added and the liquid temperature was adjusted to 28° C., and then, an aqueous solution obtained by adding 108 g of pure water to 250 g of a formalin aqueous solution (containing 37 mass % of formaldehyde and 8 mass % of methanol) was added thereto while stirring the silver-ammine complex aqueous solution to reduce the silver-ammine complex, whereby a slurry containing silver particles was obtained. Further, to the slurry containing the silver particles, 6.14 g of a material obtained by diluting the above-mentioned stearic acid emulsion 10 times was added, and thereafter, stirring was stopped to precipitate the surface-treated silver particles. The liquid in which the silver particles were precipitated was filtered, and the silver particles were washed with water until the electrical conductivity of the liquid after water passed through the silver particles became 0.2 mS/m or less, followed by vacuum drying at 73° C., whereby a silver powder according to Comparative Example 1 was obtained. With respect to the obtained silver powder, the particle size distribution was measured. The measurement result is shown in Table 2.

Example 1

5 g of the above-mentioned commercially available stearic acid emulsion was dispensed in a 100 mL beaker, heated to 90° C. on a hot plate, and then, boiling water was added thereto to bring the total liquid amount to 50 mL. Thereafter, by using a homogenizer (Biomixer BM-4, shaft tip diameter: 32 mm) manufactured by Nihonseiki Kaisha, Ltd., the mixture was stirred at 10,000 rpm for 1.5 minutes, and cooled to room temperature by being allowed to cool for 6 hours, whereby an emulsion of Example 1 was obtained. The heated temperature is equal to or higher than the melting points of stearic acid (melting point: 69.6° C.) and palmitic acid (melting point: 62.9° C.) and is equal to or higher than 60° C., which is a cloud point. The obtained emulsion is diluted 10 times by adding boiling water to 5 g of the stearic acid emulsion so that the total liquid amount is 50 mL.

With respect to the obtained emulsion, the particle size distribution of the micelles contained in the emulsion was measured using Microtrac MT3300EXII manufactured by Nikkiso Co., Ltd. The measurement result of the particle size distribution is also shown in FIG. 1.

The micelles contained in the emulsion had a volume-based cumulative 10% particle diameter $D_{10}$ of 0.35 µm, a cumulative 50% particle diameter $D_{50}$ of 0.62 µm, and a cumulative 90% particle diameter $D_{90}$ of 2.3 µm. It had a peak top at 0.5 µm. The measurement results are also shown in Table 1. By using the above-mentioned method for preparing an emulsion, micelles contained in the commercially available stearic acid emulsion could be micronized.

A silver powder according to Example 1 subjected to a surface treatment by the same procedure as in Comparative Example 1 except that a 6.14 g portion was taken out of the micronized emulsion and added to the slurry in which the silver powder was dispersed was obtained. With respect to the obtained silver powder, the particle size distribution was measured. The measurement result is also shown in Table 2.

From the results in Table 2, it was found that the silver powders of Example 1 and the below-mentioned Example 2 obtained by adding the emulsion having a small particle diameter show a smaller $(D_{90}-D_{10})/D_{50}$ value and a steeper peak as compared with the silver powder of Comparative Example 1.

Example 2

When 5 g of the above-mentioned commercially available stearic acid emulsion was dispensed in a 100 mL, beaker, and the beaker was placed in a hot water bath (constant temperature water tank) and heated to 62.8° C., the gradual generation of a white solid was confirmed. This is because the cloud point of the emulsifier contained in Selosol is 60° C. The surface treatment agent contained in the above-mentioned commercially available stearic acid emulsion is stearic acid (melting point: 69.6° C.) and palmitic acid (melting point: 62.9° C.) which are fatty acids, and is heated at a temperature lower than the melting points of these fatty acids, and therefore, the bond between these fatty acids and the surfactant is broken, and the white solid is solidified, and the white suspension is considered to be a suspension containing the surfactant that covered the surfaces of the fatty acids at the time of micelle formation, and the solids of the fatty acids, and water as the solvent. Since the generation of a white solid in the white suspension did not occur anymore in 2 minutes after heating, the suspension was maintained in this state for 5 minutes.

Figure 2:
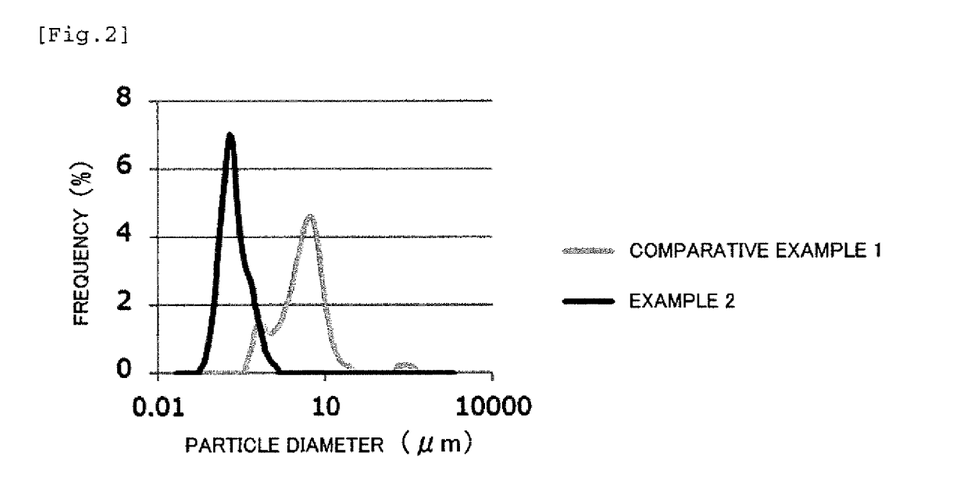
FIG. 2 is a graph of comparison of the measurement results of the particle diameter distribution of micelles contained in emulsions obtained in Example 2 and Comparative Example 1.

Thereafter, the suspension was heated to 95° C. on a heater, and stearic acid and palmitic acid, which became white solids, were melted into oil droplets. To the white suspension in a state where the oil droplets of the fatty acids were floating, 10 mL of boiling water was added using a pipette, and succeedingly, boiling water was added thereto until the total liquid amount reached 50 mL. Thereafter, the beaker was transferred to a hot water bath (constant temperature water tank) at 80° C., stirring was performed at 10,000 rpm for 1.5 minutes using the above-mentioned homogenizer, and then, the beaker was taken out of the hot water bath and cooled to room temperature by being allowed to cool for 6 hours, whereby an emulsion of Example 2 was obtained. The result of measuring the particle size distribution of the micelles contained in the obtained emulsion is shown in FIG. 2. In FIG. 2, the measurement result of Comparative Example 1 is also shown for comparison.

The micelles according to Example 2 had a volume-based cumulative 10% particle diameter $D_{10}$ of 0.1 µm, a volume-based cumulative 50% particle diameter $D_{50}$ of 0.2 µm, and a cumulative 90% particle diameter $D_{90}$ of 0.5 µm, and a more micronized emulsion than that of Example 1 was obtained. The measurement results are also shown in Table 1. With respect to the emulsion, the particle size distribution was measured 2 weeks after the preparation, but the particle size distribution was almost unchanged.

A silver powder according to Example 2 was obtained by the same procedure as in Example 1 except that a 6.14 g portion was taken out of the emulsion obtained by the above-mentioned procedure and used. With respect to the obtained silver powder, the particle size distribution was measured. The measurement result is also shown in Table 2.

Comparative Example 2

Figure 3:
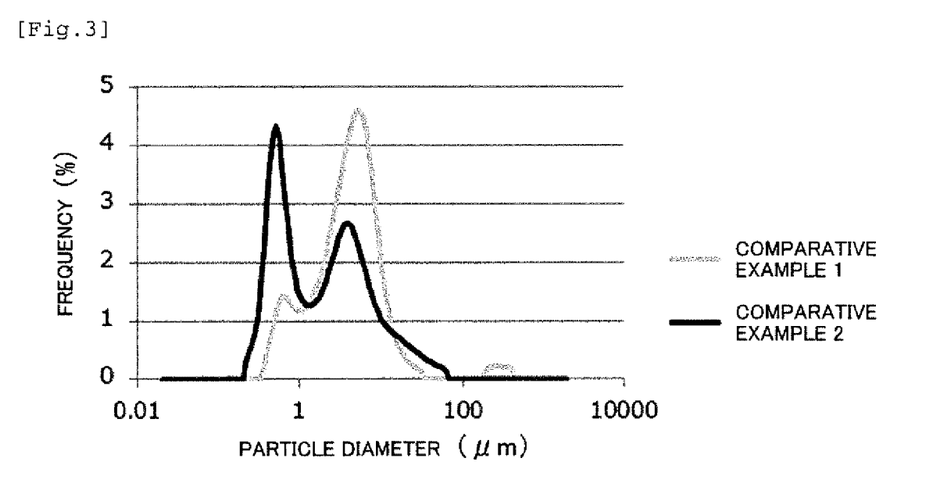
FIG. 3 is a graph of comparison of the measurement results of the particle diameter distribution of micelles contained in emulsions obtained in Comparative Example 1 and Comparative Example 2.

5 g of the above-mentioned commercially available stearic acid emulsion was dispensed in a 100 mL beaker, pure water was added thereto until the total liquid reached 50 mL, and at room temperature, stirring was performed at 10,000 rpm for 1.5 minutes using the above-mentioned homogenizer, whereby an emulsion of Comparative Example 2 was obtained. The result of measuring the particle size distribution of the micelles contained in the obtained emulsion is shown in FIG. 3. In FIG. 3, the measurement result of Comparative Example 1 is also shown for comparison.

When the particle size distribution of the micelles contained in the obtained emulsion was measured, the micelles had a volume-based cumulative 10% particle diameter $D_{10}$ of 0.4 µm, a volume-based cumulative 50% particle diameter $D_{50}$ of 1.8 µm, and a cumulative 90% particle diameter $D_{90}$ of 10.5 µm.

As compared with the particle size distribution of Comparative Example 1, although the $D_{50}$ of Comparative Example 2 was halved, the $D_{90}$ increased, and it was found that when stirring is performed without heating as in Comparative Example 2, both dispersion and aggregation of micelles occur. The measurement results are shown in Table 1.

Example 3

125 g of industrial aqueous ammonia at a concentration of 28 mass % (corresponding to 5.4 molar equivalents of ammonia per mole of silver) was added to 3,100 g of a silver nitrate aqueous solution containing 41 g of silver, whereby a silver-ammine complex aqueous solution was obtained. To this silver-ammine complex aqueous solution, 2.28 g of a sodium hydroxide aqueous solution at a concentration of 20 mass % was added and the liquid temperature was adjusted to 25° C., and then, an aqueous solution obtained by diluting 10 g of hydrous hydrazine at a concentration of 80 mass % with 101 g of pure water was added thereto while stirring, whereby a slurry containing silver particles was obtained. Further, a 12.7 g portion was taken out of the emulsion obtained in Example 2 described above and added to the obtained slurry containing the silver particles, followed by stirring. Thereafter, the stirring was stopped to precipitate the silver particles, and the liquid in which the silver particles were precipitated was filtered, and the silver particles were washed with water until the electrical conductivity of the liquid after water passed through the silver particles became 0.2 mS/m or less, followed by vacuum drying at 73° C., whereby a silver powder of Example 3 was obtained.

Comparative Example 3

A silver powder according to Comparative Example 3 was obtained by the same procedure as in Example 3 except that

13

12.7 g of a material obtained by diluting 1.27 g of the above-mentioned commercially available stearic acid emulsion 10 times was used.

Example 4

Figure 4:
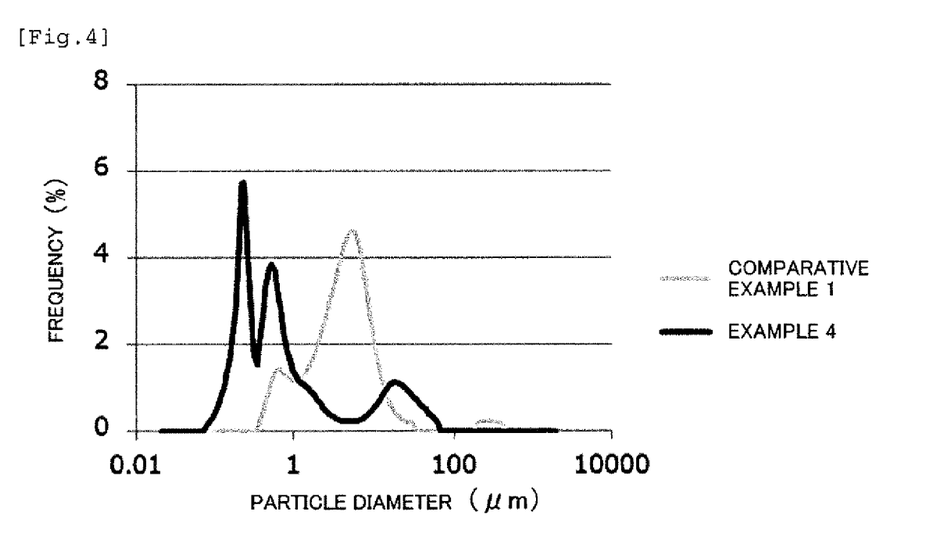
FIG. 4 is a graph of comparison of the measurement results of the particle diameter distribution of micelles contained in emulsions obtained in Example 4 and Comparative Example 1.

0.775 g of stearic acid (manufactured by FUJIFILM Wako Pure Chemical Corporation, purity: 95%) which is a surface treatment agent and 0.075 g of a surfactant (EMULGEN 350, manufactured by Kao Corporation) were dispensed in a 100 mL beaker and heated to about 80° C. to melt the surfactant and stearic acid. Boiling water was added thereto until the total liquid reached 50 mL, and stirring was performed at 10,000 rpm for 1.5 minutes using the above-mentioned homogenizer, whereby an emulsion of Example 4 was obtained. The result of measuring the particle size distribution of the micelles contained in the obtained emulsion is shown in FIG. 4. In FIG. 4, the measurement result of Comparative Example 1 is also shown for comparison.

The micelles of this emulsion had a volume-based cumulative 10% particle diameter $D_{10}$ of 0.2 μm, a volume-based cumulative 50% particle diameter $D_{50}$ of 0.5 μm, and a cumulative 90% particle diameter $D_{90}$ of 17.6 μm, and an emulsion in which the cumulative 50% particle diameter $D_{50}$ of the micelles is smaller than that of the commercially available stearic acid emulsion could be obtained. The measurement results are shown in Table 1.

A silver powder of Example 4 was obtained in the same manner as in Example 3 except that a 12.7 g portion was taken out of the above-mentioned emulsion of Example 4 and used.

With respect to the silver powders obtained in Examples 3 and 4 and Comparative Example 3, the particle size distribution was measured. Further, a silver paste was produced by a production method according to the above-mentioned [Method for Producing Silver Paste], and by using the obtained silver paste, an electrically conductive film was formed by the procedure described in the above-mentioned [Screen Printing], and the volume resistivity of the electrically conductive film was determined. The results are also shown in Table 2.

From the results in Table 2, it was found that the silver powders of Examples 3 and 4 obtained using the emulsion in which the particle diameter distribution of the micelles is small show a smaller $(D_{90}-D_{10})/D_{50}$ value and a steeper peak as compared with the silver powder of Comparative Example 3.

The volume resistivities of the electrically conductive films when using the silver powders obtained in Examples 3 and 4 were 56.2 μΩ·cm and 66.0 μΩ·cm, which were smaller values than the volume resistivity 74.0 μΩ·cm of the electrically conductive film using the silver powder obtained in Comparative Example 3.

When the cross section of the electrically conductive film was observed by SEM, it was found that the silver particles contained in the electrically conductive film using the silver powder obtained in Example 3 were more densely packed as compared with those of Comparative Example 3. The reason is presumed to be because the reduction in the particle diameter of the emulsion not only simply makes the particle size distribution steep, but also may suppress the uneven distribution of the surface treatment agent adhered to the surfaces of the silver particles.

Example 5

1.75 g of linolenic acid (manufactured by FUJIFILM Wako Pure Chemical Corporation, purity: 60%) which is a surface treatment agent and 0.025 g of a surfactant (EMULGEN 350, manufactured by Kao Corporation) were dispensed in a 100 mL beaker and heated to about 80° C. to melt the surfactant. Boiling water was added thereto until the total liquid reached 50 mL, and stirring was performed at 10,000 rpm for 1.5 minutes using the above-mentioned homogenizer, whereby an emulsion of Example 5 was obtained.

The micelles of this emulsion had a volume-based cumulative 10% particle diameter $D_{10}$ of 0.57 μm, a volume-based cumulative 50% particle diameter $D_{50}$ of 1.34 μm, and a cumulative 90% particle diameter $D_{90}$ of 2.93 μm, and an emulsion in which the particle diameter of the micelles is small could be obtained.

157 g of industrial aqueous ammonia at a concentration of 28 mass % (corresponding to 5.4 molar equivalents of ammonia per mole of silver) was added to 3,454 g of a silver nitrate aqueous solution containing 52 g of silver, whereby a silver-ammine complex aqueous solution was obtained. To this silver-ammine complex aqueous solution, 9.6 g of a sodium hydroxide aqueous solution at a concentration of 20 mass % was added and the liquid temperature was adjusted to 25° C., and then, an aqueous solution obtained by diluting 13 g of hydrous hydrazine at a concentration of 80 mass % with 128 g of pure water was added thereto while stirring, whereby a slurry containing silver particles was obtained. 5.9 g of the above-mentioned linolenic acid emulsion was taken out and added to the obtained slurry containing the silver particles, followed by stirring. Thereafter, the stirring was stopped to precipitate the silver particles, and the liquid in which the silver particles were precipitated was filtered, and the silver particles were washed with water until the electrical conductivity of the liquid after water passed through the silver particles became 0.2 mS/m or less, followed by vacuum drying at 73° C., whereby a silver powder of Example 5 was obtained. With respect to the obtained silver powder, the particle size distribution was measured. The measurement result is shown in Table 2.

Comparative Example 4

A silver powder of Comparative Example 4 was obtained in the same manner as in Example 5 except that in place of the linolenic acid emulsion of Example 5, 5.9 g of a material obtained by dissolving 0.21 g of linolenic acid which is a surface treatment agent in 5.72 g of ethanol was added. Linolenic acid was dissolved, and micelles could not be measured. With respect to the obtained silver powder, the particle size distribution was measured. The measurement result is also shown in Table 2.

Example 6

Figure 5:
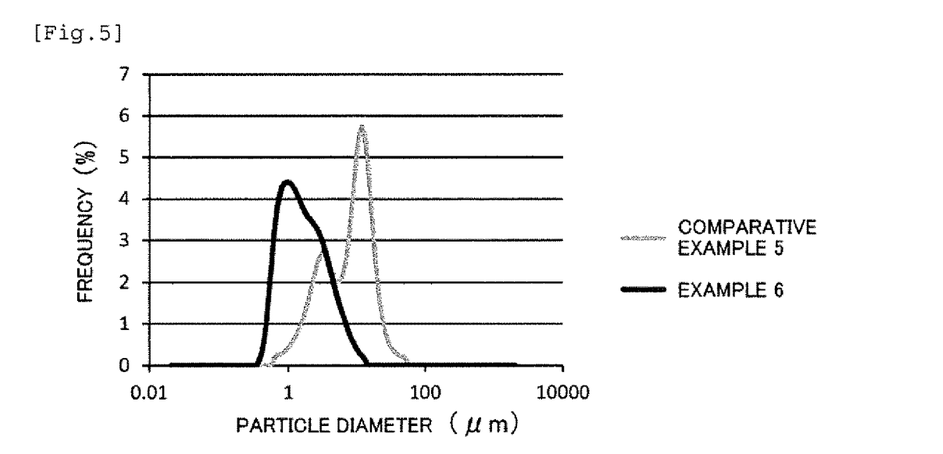
FIG. 5 is a graph of comparison of the measurement results of the particle diameter distribution of micelles contained in emulsions obtained in Example 6 and Comparative Example 5.

0.75 g of myristic acid (manufactured by FUJIFILM Wako Pure Chemical Corporation, Wako Special Grade) which is a surface treatment agent and 0.075 g of a surfactant (EMULGEN 350, manufactured by Kao Corporation) were dispensed in a 100 mL beaker and heated to about 80° C. to melt the surfactant. Boiling water was added thereto until the total liquid reached 50 mL, and stirring was performed at 10,000 rpm for 3 minutes using a biomixer (model: BM-4) manufactured by Nihonseiki Kaisha, Ltd., whereby a myristic acid emulsion in which the $D_{50}$ of the micelles is 1.03 μm was obtained. The result of measuring the particle size distribution of the micelles contained in the obtained emulsion is shown in FIG. 5. In FIG. 5, the measurement result of Comparative Example 5 is also shown for comparison.

A silver powder according to Example 6 was obtained by the same procedure as in Example 3 except that 14.9 g of the above-mentioned emulsion was used. With respect to the obtained silver powder, the particle size distribution was measured. The measurement result is shown in Table 3.

Comparative Example 5

A silver powder of Comparative Example 5 was obtained in the same manner as in Example 6 except that a myristic acid emulsion in which the $D_{50}$ of the micelles is 8.30 μm was obtained by setting the stirring conditions of the biomixer to 3,000 rpm and 1.5 minutes.

Example 7

Figure 6:
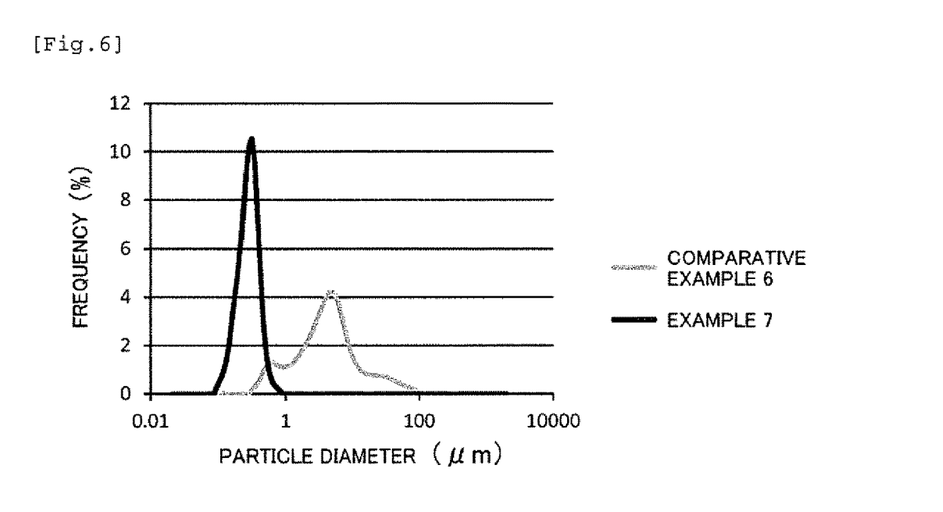
FIG. 6 is a graph of comparison of the measurement results of the particle diameter distribution of micelles contained in emulsions obtained in Example 7 and Comparative Example 6.

1 g of lauric acid (manufactured by FUJIFILM Wako Pure Chemical Corporation, Wako 1st Grade) which is a surface treatment agent and 0.5 g of a surfactant (EMULGEN 350, manufactured by Kao Corporation) were dispensed in a 100 mL beaker and heated to about 80° C. to melt the surfactant. Boiling water was added thereto until the total liquid reached 50 mL, and stirring was performed at 10,000 rpm for 1.5 minutes using a biomixer (model: BM-4) manufactured by Nihonseiki Kaisha, Ltd., whereby a lauric acid emulsion in which the $D_{50}$ of the micelles is 0.27 μm was obtained. The result of measuring the particle size distribution of the micelles contained in the obtained emulsion is shown in FIG. 6. In FIG. 6, the measurement result of Comparative Example 6 is also shown for comparison.

A silver powder of Example 7 was obtained by the same procedure as in Example 3 except that 9.8 g of the above-mentioned emulsion was used. With respect to the obtained silver powder, the particle size distribution was measured. The measurement result is shown in Table 3.

Comparative Example 6

A silver powder of Comparative Example 6 was obtained in the same manner as in Example 7 except that a lauric acid emulsion in which the $D_{50}$ of the micelles is 3.96 μm was obtained by setting the stirring conditions of the biomixer to 3,000 rpm and 1.5 minutes.

Example 8

Figure 7:
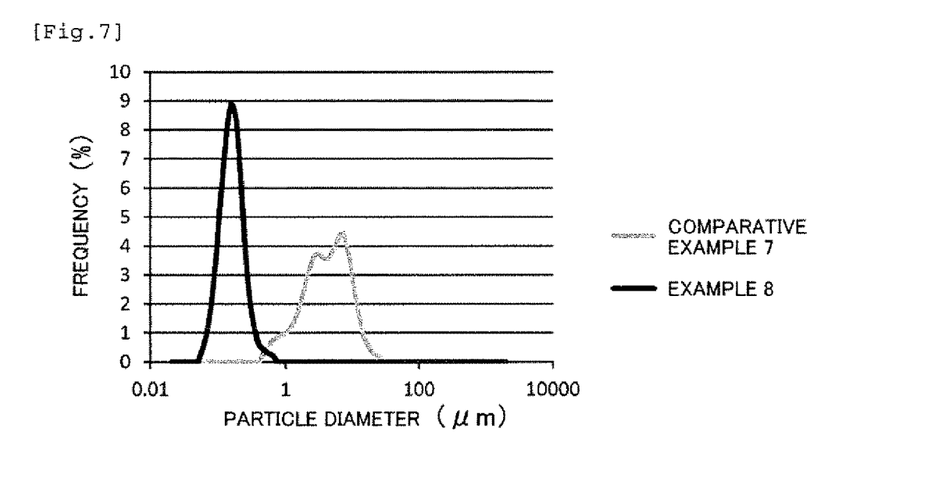
FIG. 7 is a graph of comparison of the measurement results of the particle diameter distribution of micelles contained in emulsions obtained in Example 8 and Comparative Example 7.

1.75 g of oleic acid (NAA-34, manufactured by NOF Corporation) which is a surface treatment agent and 0.525 g of a surfactant (EMULGEN 350, manufactured by Kao Corporation) were dispensed in a 100 mL beaker and heated to about 80° C. to melt the surfactant. Boiling water was added thereto until the total liquid reached 50 mL, and stirring was performed at 10,000 rpm for 1.5 minutes using a biomixer (model: BM-4) manufactured by Nihonseiki Kaisha, Ltd., whereby an oleic acid emulsion in which the $D_{50}$ of the micelles is 0.15 μm was obtained. The result of measuring the particle size distribution of the micelles contained in the obtained emulsion is shown in FIG. 7. In FIG. 7, the measurement result of Comparative Example 7 is also shown for comparison.

A silver powder of Example 8 was obtained by the same procedure as in Example 3 except that 5.6 g of the above-mentioned emulsion was used. With respect to the obtained silver powder, the particle size distribution was measured. The measurement result is shown in Table 3.

Comparative Example 7

A silver powder of Comparative Example 7 was obtained in the same manner as in Example 8 except that an oleic acid emulsion in which the $D_{50}$ of the micelles is 4.05 μm was obtained by setting the stirring conditions of the biomixer to 3,000 rpm and 1.5 minutes.

Example 9

Figure 8:
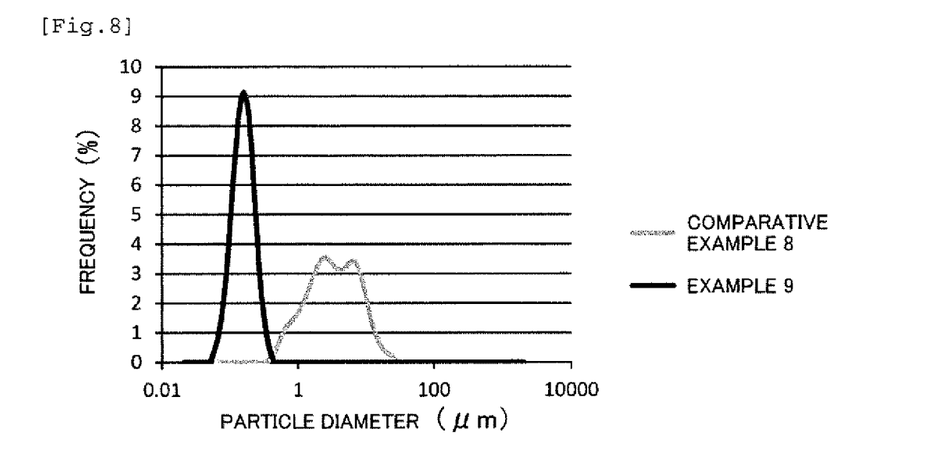
FIG. 8 is a graph of comparison of the measurement results of the particle diameter distribution of micelles contained in emulsions obtained in Example 9 and Comparative Example 8.

1.75 g of linoleic acid (manufactured by Aldrich Corporation, purity: 58 to 74%) which is a surface treatment agent and 0.525 g of a surfactant (EMULGEN 350, manufactured by Kao Corporation) were dispensed in a 100 mL beaker and heated to about 80° C. to melt the surfactant. Boiling water was added thereto until the total liquid reached 50 mL, and stirring was performed at 10,000 rpm for 1.5 minutes using a biomixer (model: BM-4) manufactured by Nihonseiki Kaisha, Ltd., whereby a linoleic acid emulsion in which the $D_{50}$ of the micelles is 0.15 μm was obtained. The result of measuring the particle size distribution of the micelles contained in the obtained emulsion is shown in FIG. 8. In FIG. 8, the measurement result of Comparative Example 8 is also shown for comparison.

A silver powder of Example 9 was obtained by the same procedure as in Example 3 except that 5.6 g of the above-mentioned emulsion was used. With respect to the obtained silver powder, the particle size distribution was measured. The measurement result is shown in Table 3.

Comparative Example 8

A silver powder of Comparative Example 8 was obtained in the same manner as in Example 9 except that a linoleic acid emulsion in which the $D_{50}$ of the micelles is 3.13 μm was obtained by setting the stirring conditions of the biomixer to 3,000 rpm and 1.5 minutes.

Example 10

Figure 9:
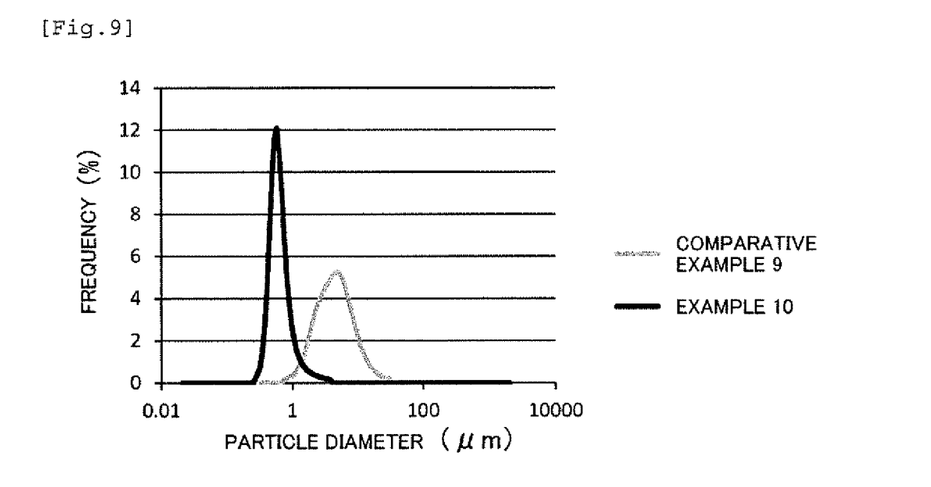
FIG. 9 is a graph of comparison of the measurement results of the particle diameter distribution of micelles contained in emulsions obtained in Example 10 and Comparative Example 9.

1.75 g of linolenic acid (manufactured by FUJIFILM Wako Pure Chemical Corporation, purity: 60%) which is a surface treatment agent and 0.025 g of a surfactant (EMULGEN 350, manufactured by Kao Corporation) were dispensed in a 100 mL, beaker and heated to about 80° C. to melt the surfactant. Boiling water was added thereto until the total liquid reached 50 mL, and the mixture was subjected to one pass at 138 MPa using a high-pressure homogenizer (model LV1, 10 mL syringe, batch type) manufactured by Microfluidics Corporation, whereby a linolenic acid emulsion in which the $D_{50}$ of the micelles is 0.57 μm was obtained. The result of measuring the particle size distribution of the micelles contained in the obtained emulsion is shown in FIG. 9. In FIG. 9, the measurement result of Comparative Example 9 is also shown for comparison.

A silver powder of Example 10 was obtained by the same procedure as in Example 3 except that 5.6 g of the above-mentioned emulsion was used. With respect to the obtained silver powder, the particle size distribution was measured. The measurement result is also shown in Table 3.

Comparative Example 9

1.75 g of linolenic acid (manufactured by FUJIFILM Wako Pure Chemical Corporation, purity: 60%) which is a surface treatment agent and 0.025 g of a surfactant (EMULGEN 350, manufactured by Kao Corporation) were dispensed in a 100 mL beaker and heated to about 80° C. to melt the surfactant. Boiling water was added thereto until the total liquid reached 50 mL, and stirring was performed at 10,000 rpm for 1.5 minutes using a biomixer (model: BM-4) manufactured by Nihonseiki Kaisha, Ltd., whereby a linolenic acid emulsion in which the $D_{50}$ of the micelles is 4.27 μm was obtained.

A silver powder of Comparative Example 9 was obtained in the same manner as in Example 10 except that the above-mentioned emulsion was used.

TABLE 1

|  | Volume-based cumulative particle diameter of micelles (μm) | | |
| --- | --- | --- | --- |
|  | $D_{10}$ | $D_{50}$ | $D_{90}$ |
| Example 1 | 0.4 | 0.6 | 2.3 |
| Example 2 | 0.1 | 0.2 | 0.5 |
| Example 4 | 0.2 | 0.5 | 17.6 |
| Comparative example 1 | 0.8 | 4.0 | 9.8 |
| Comparative example 2 | 0.4 | 1.8 | 10.5 |

TABLE 2

|  | Emulsion | | Particle diameter of silver powder (μm) | | | | | $(D_{90} - D_{10})/$ | Volume resistivity |
| --- | --- | --- | --- | --- | --- | --- | --- | --- | --- |
|  | Surface treatment agent | $D_{50}$ (μm) | $D_{10}$ | $D_{50}$ | $D_{90}$ | $D_{95}$ | $D_{max}$ | $D_{50}$ | (μΩ · cm) |
| Comparative example 1 | stearic acid | 4.0 | 1.46 | 2.38 | 3.83 | 4.56 | 9.25 | 1.00 | — |
| Example 1 | stearic acid | 0.6 | 1.39 | 2.22 | 3.50 | 4.15 | 9.25 | 0.95 | — |
| Example 2 | stearic acid | 0.2 | 1.43 | 2.29 | 3.63 | 4.30 | 9.25 | 0.96 | — |
| Comparative example 3 | stearic acid | 1.8 | 0.18 | 0.67 | 2.88 | 4.41 | 13.08 | 4.01 | 74.0 |
| Example 3 | stearic acid | 0.2 | 0.20 | 0.66 | 1.54 | 2.12 | 6.54 | 2.05 | 56.2 |
| Example 4 | stearic acid | 0.5 | 0.28 | 0.93 | 2.60 | 3.80 | 11.00 | 2.52 | 66.0 |
| Comparative example 4 | linolenic acid | dissolved | 0.31 | 0.87 | 1.91 | 2.54 | 7.78 | 1.84 | — |
| Example 5 | linolenic acid | 1.34 | 0.28 | 0.73 | 1.43 | 1.79 | 4.63 | 1.58 | — |

TABLE 3

|  | Emulsion | | Particle diameter of silver powder (μm) | | | | | $(D_{90} - D_{10})/$ |
| --- | --- | --- | --- | --- | --- | --- | --- | --- |
|  | Surface treatment agent | $D_{50}$ (μm) | $D_{10}$ | $D_{50}$ | $D_{90}$ | $D_{95}$ | $D_{max}$ | $D_{50}$ |
| Comparative example 5 | myristic acid | 8.30 | 0.17 | 0.60 | 1.17 | 1.43 | 3.27 | 1.66 |
| Example 6 | myristic acid | 1.03 | 0.20 | 0.62 | 1.18 | 1.43 | 3.27 | 1.58 |
| Comparative example 6 | lauric acid | 3.96 | 0.21 | 0.73 | 1.57 | 2.09 | 6.54 | 1.88 |
| Example 7 | lauric acid | 0.27 | 0.19 | 0.61 | 1.24 | 1.59 | 4.63 | 1.71 |
| Comparative example 7 | oleic acid | 4.05 | 0.17 | 0.53 | 1.05 | 1.30 | 3.27 | 1.67 |
| Example 8 | oleic acid | 0.15 | 0.16 | 0.50 | 0.96 | 1.17 | 2.75 | 1.61 |
| Comparative example 8 | linoleic acid | 3.13 | 0.18 | 0.61 | 1.21 | 1.54 | 4.63 | 1.68 |
| Example 9 | linoleic acid | 0.15 | 0.17 | 0.53 | 1.00 | 1.23 | 2.75 | 1.57 |
| Comparative example 9 | linolenic acid | 4.27 | 0.19 | 0.65 | 1.26 | 1.57 | 3.89 | 1.67 |
| Example 10 | linolenic acid | 0.57 | 0.26 | 0.73 | 1.33 | 1.62 | 3.89 | 1.47 |

From the above results, it is found that by using an emulsion with a small $D_{50}$, the $(D_{90}-D_{10})/D_{50}$ ratio of a silver powder to be obtained becomes small, and the dispersibility of the silver powder is improved.

The invention claimed is:

1. A method for producing a silver powder, in which silver ions are converted into a silver complex with a complexing agent and the silver complex is reduced, thereby obtaining a silver powder, comprising:

a silver complexing step of forming a silver-ammine complex aqueous solution using ammonium ions as the complexing agent for complexing the silver ions;

a reduction step of reducing the silver complex with a reducing agent by adding the reducing agent to the aqueous solution containing the silver complex, thereby obtaining a slurry of a silver powder; and an emulsion addition step of adding an O/W-type emulsion containing micelles of a surface treatment agent having a volume-based cumulative 50% particle diameter $D_{50}$ obtained by a laser diffraction particle size distribution analysis of 1.5 µm or less to the slurry of the silver powder, thereby treating the surface of the silver powder.

2. The method for producing a silver powder according to claim 1, wherein the volume-based cumulative 50% particle diameter $D_{50}$ obtained by the laser diffraction particle size distribution analysis of the micelles of the surface treatment agent contained in the emulsion is 0.4 µm or less.

3. The method for producing a silver powder according to claim 1, wherein the surface treatment agent contained in the emulsion is a fatty acid having 8 or more carbon atoms in a straight chain.

4. The method for producing a silver powder according to claim 3, wherein the surface treatment agent contained in the emulsion is a long-chain fatty acid having 12 or more carbon atoms.

5. The method for producing a silver powder according to claim 4, wherein the surface treatment agent contained in the emulsion is one type or two types of palmitic acid and stearic acid.

6. The method for producing a silver powder according to claim 4, wherein the surface treatment agent contained in the emulsion is either linoleic acid or linolenic acid.

* * * * *